United States Patent [19]

Nakayama et al.

[11] Patent Number: 4,933,250
[45] Date of Patent: Jun. 12, 1990

[54] MAGENTA COLOR TONER FOR DEVELOPING LATENT ELECTROSTATIC IMAGES IN COLOR ELECTROPHOTOGRAPHY

[75] Inventors: Nobuhiro Nakayama, Susono; Yasuo Asahina, Numazu; Mitsuo Aoki, Numazu; Hiroyuki Fushimi, Numazu; Kayo Makita, Numazu, all of Japan

[73] Assignee: Ricoh Company Ltd., Tokyo, Japan

[21] Appl. No.: 239,553

[22] Filed: Sep. 1, 1988

[30] Foreign Application Priority Data

Sep. 11, 1987 [JP] Japan ................. 62-228018

[51] Int. Cl.$^5$ ............................. G03G 9/08
[52] U.S. Cl. .......................... 430/106; 430/109
[58] Field of Search ..................... 430/106, 109

[56] References Cited

U.S. PATENT DOCUMENTS

| Re. 27,912 | 2/1974 | Miller | 430/106.6 |
| 3,392,139 | 7/1968 | Dingman | 430/106 |
| 3,954,640 | 5/1976 | Lu et al. | 430/112 X |
| 4,108,786 | 8/1978 | Takayama | 430/106.6 X |
| 4,145,300 | 3/1979 | Hendriks | 430/110 X |

Primary Examiner—J. David Welsh
Attorney, Agent, or Firm—Cooper & Dunham

[57] ABSTRACT

A magenta toner is disclosed, which comprises a coloring composition comprising a thioindigo pigment, and a xanthene dye having general formula (I) or a laked xanthene dye thereof, and a binder resin:

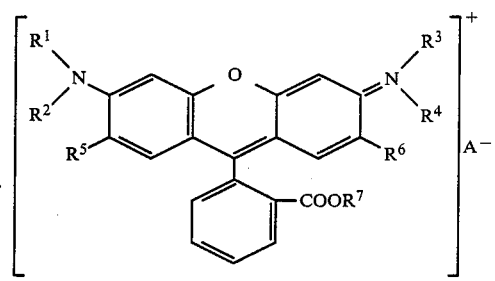

wherein $R^1$, $R^2$, $R^5$, $R^6$, and $R^7$ each represent hydrogen or a lower alkyl group; $R^3$ and $R^4$ each represent a lower alkyl group; and $A^-$ represents halogen.

15 Claims, 1 Drawing Sheet

MAGENTA COLOR TONER FOR DEVELOPING LATENT ELECTROSTATIC IMAGES IN COLOR ELECTROPHOTOGRAPHY

BACKGROUND OF THE INVENTION

The present invention relates to a magenta color toner used in color electrophotography.

Conventionally, as a magenta toner, there is known a toner containing a thioindigo pigment as disclosed in Japanese Laid-Open Patent Application No. 60-95549. This toner has the advantage that its color scarcely changes even when exposed to light, but is not capable of yielding printed images in a sufficiently clear magenta color for use in practice.

Toners containing xanthene dyes are also known, which are disclosed in Japanese Laid-Open Patent Application Nos. 51-24234, 51-144625, 52-80839, 53-20335, 53-144741, 57-130044, 57-130045 and 57-130046. These toners can yield printed images in a clear magenta color, but have the shortcomings that their color is easily changed when exposed to light and that the color of printed images fades with time.

SUMMARY OF THE INVENTION

It is therefore an object of the present invention to provide a magenta toner with an improved resistance to light, from which the above-described shortcomings of the conventional toners have been eliminated, in particular, which toner is capable of producing printed images which are in a clear magenta color and hardly fade with time.

The above object of the present invention is attained by a magenta toner which comprises a coloring composition comprising a thioindigo pigment, and a xanthene dye having general formula (I) or a laked xanthene dye thereof, and a binder resin:

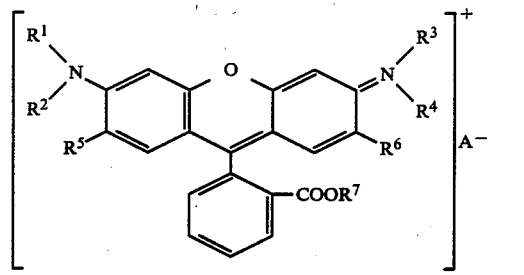

wherein $R^1$, $R^2$, $R^5$, $R^6$ and $R^7$ each represent hydrogen or a lower alkyl group; $R^3$ and $R^4$ each represent a lower alkyl group; and $A^-$ represents halogen.

DETAILED DESCRIPTION OF THE PREFERRED EMBODIMENTS

Figure 1:
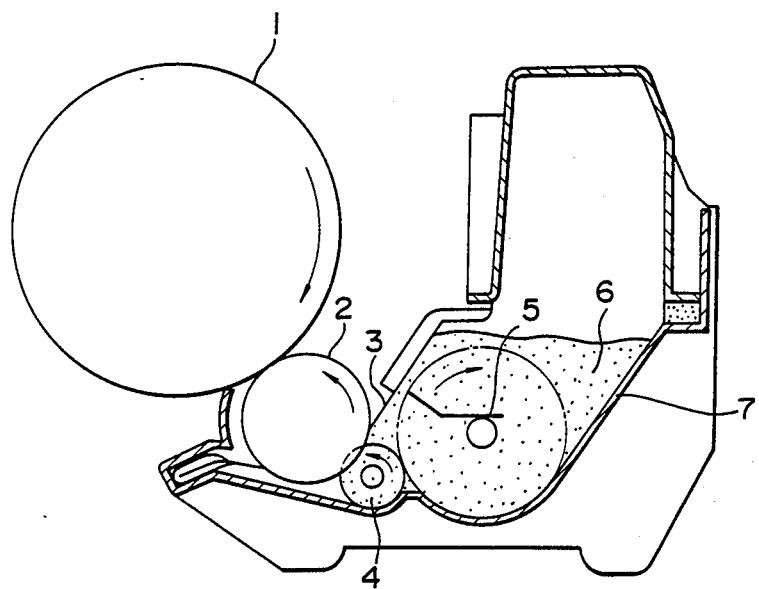
FIG. 1 is a schematic cross-sectional view of a development unit, in which the magenta toner according to the present invention is used.

As mentioned previously, the magenta toner according to the present invention comprises a coloring composition comprising a thioindigo pigment, and a xanthene dye having general formula (I) or a laked xanthene dye thereof, and a binder resin:

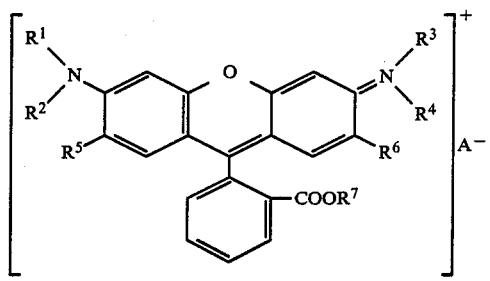

wherein $R^1$, $R^2$, $R^5$, $R^6$ and $R^7$ each represent hydrogen or a lower alkyl group; $R^3$ and $R^4$ each represent a lower alkyl group; and $A^-$ represents halogen.

Examples of the lower alkyl group are alkyl groups having 1 to 4 carbon atoms, such as methyl, ethyl and propyl.

In the magenta toner, it is preferable that the amount of the thioindigo pigment be in the range of 0.5 to 20 parts by weight to 100 parts by weight of the amount of a binder resin.

Representative examples of the above-mentioned thioindigo pigment for use in the present invention are as follows:

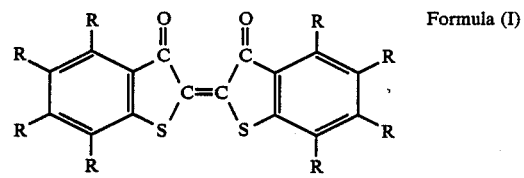

Formula (I)

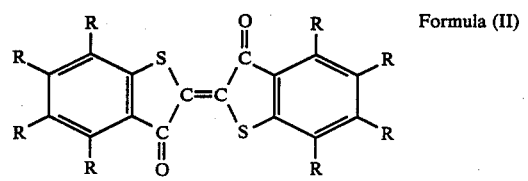

Formula (II)

wherein R represents H, $CH_3$ or Cl.

Specific examples of the thioindigo pigment are as follows:

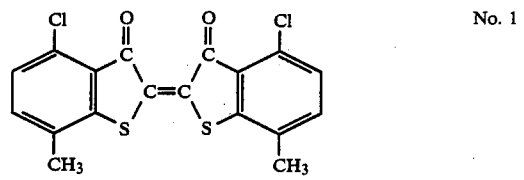

No. 1

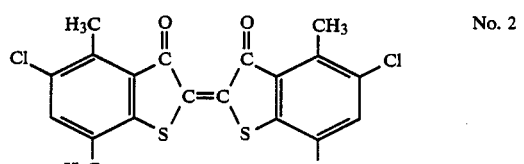

No. 2

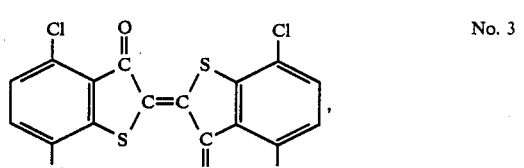

No. 3

-continued and

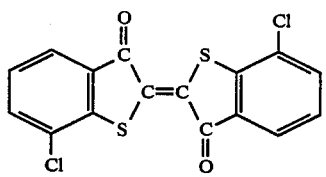
No. 4

In the magenta toner according to the present invention, it is preferable that the amount of the xanthene dye or the laked xanthene dye be in the range of 0.2 to 20 parts by weight, more preferably in the range of 0.5 to 10 parts by weight, to 100 parts by weight of the binder resin.

A representative example of the above-mentioned xanthene dye is represented by the following formula:

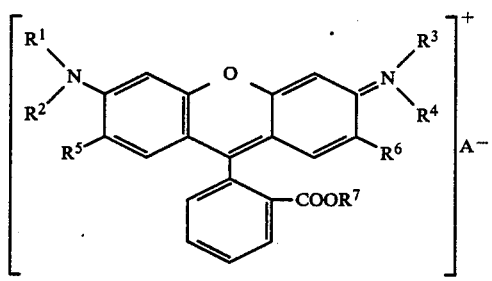

wherein $R^1$, $R^2$, $R^5$, $R^6$ and $R^7$ each represent hydrogen or a lower alkyl group; $R^3$ and $R^4$ each represent a lower alkyl group; and $A^-$ is halogen.

Specific examples of the xanthene dye are C.I. Solvent Red 49, C.I. Solvent Red 52, C.I. Solvent Red 180. Commercially available xanthene dyes for use in the present invention are Rhodamine Base 2B, Rhodamine Base FB, Helio Oil Red R, Macrolex Red 5B, Oil Pink OP and Oil Pink #312.

The lake formation of the above-mentioned xanthene dyes can be performed by conventional methods. For example, any of the above xanthene dyes is dissolved in an aqueous solution of acetic acid. To this solution, an aqueous solution of sodium diphosphate, an aqueous solution of sodium tungstate and an aqueous solution of sodium molybdate are added to precipitate a laked pigment. The laked pigment is then filtered off, washed with water, dried and ground. In such lake formation, not only the above phosphate, molybdate and tungstate, but also sulfate, perchlorate, tetraphenylborate, benzenesulfonate and p-toluenesulfonate can be used as the above anion $A^-$ component.

In the magenta toner according to the present invention, it is preferable that the mixing ratio of the thioindigo pigment to the xanthene dye or the mixing ratio of the thioindigo pigment to the laked xanthene dye be in the range of (1:1) to (5:1).

When the amount of the thioindigo pigment is less than the amount in the above-mentioned mixing ratio, the color of the prepared toner easily changes when exposed to light. On the other hand, when the amount of the xanthene dye or the amount of the laked xanthene dye is less than the amount in the above-mentioned mixing ratio, the toner hardly yields printed images in a clear magenta color.

As an agent for controlling the electric charge of the magenta toner according to the present invention (hereinafter referred to as a charge controlling agent), any conventional charge controlling agents can be employed. As a negative charge controlling agent, for example, metal (cobalt, chromium, iron and zinc) complexes of salicylic acid, naphthoic acid and dicarboxylic acids can be employed. As a positive charge controlling agent, quaternary ammonium salts and tin dioctyl oxide can be employed.

As the binder resin for use in the magenta toner according to the present invention, any conventional resins, which have a glass transition temperature ($T_g$) ranging from about 40° C. to about 150° C., such as styrene polymer, acrylic resin, epoxy resin and polyester resin, can be employed.

Specific examples of the above binder resins are the following homopolymers and copolymers: polystyrene, chloropolystyrene, poly-α-methylstyrene, styrene-chlorostyrene copolymer, styrene-propylene copolymer, styrene-butadiene copolymer, styrene-vinylacetate copolymer, styrene-maleic acid copolymer, styrene-acrylate copolymer (such as styrene-methyl acrylate copolymer, styrene-ethyl acrylate copolymer, styrene-butyl acrylate copolymer, styrene-octyl acrylate copolymer and styrene-phenyl acrylate copolymer), styrene-methacrylate copolymer (such as styrene-methyl methacrylate copolymer, styrene-ethyl methacrylate copolymer, styrene-butyl methacrylate copolymer, and styrene-phenyl methacrylate copolymer), styrene-methyl α-chloroacrylate copolymer, styrene-acrylonitrile - acrylate copolymer, styrene-vinylchloride copolymer, vinylchloride resin, rosin-modified maleic acid resin, phenolic resin, epoxy resin, polyester resin, low-molecular-weight-polyethylene, low-molecular-weightpolypropylene, ionomer resin, polyurethane resin, ketone resin, ethylene-ethyl acrylate copolymer, xylene resin and polyvinylbutyral.

In the present invention, any epoxy resins having an epoxy equivalent ranging from 900 to 3,500 can be employed. Preferable epoxy resins for use in the present invention are, for example, Epicote 1004, Epicote 1007, Epicote 1009 (made by Yuka Shell Epoxy. K.K.), Araldite GY6084, Araldite GY6097, and Araldite GY6099 (made by Chiba-Geigy, Ltd.), which are commercially available.

The polyester resin for use in the present invention is a polycondensation product of a polyhydric alcohol component and a polybasic acid component.

Preferable examples of the above polyhydric alcohol component are ethylene glycol, glycerin, 1,2-propylene glycol, 1,3-propylene glycol, neopentyl glycol, 1,4-butanediol, 1,6-hexanediol, 1,4-cyclohexane dimethyl alcohol, trimethylolethane, trimethylolpropane, and pentaerythritol.

Preferable examples of the above polybasic acid component are maleic acid, fumaric acid, isophthalic acid, terephthalic acid, adipic acid, sebacic acid, trimellitic acid, and pyromellitic acid.

According to the present invention, the above-mentioned resins can be used alone or in combination.

Furthermore, in the magenta toner according to the present invention, any conventional additives such as titanium oxide, aluminum oxide, silicon oxide, metal salts of fatty acids, fluoropolymer, silicon carbide, silicon nitride and silicone polymer may be mixed when necessary.

The magenta toner according to the present invention can be prepared by any of the conventional methods. For example, a mixture of the coloring composition, the binder resin and any of the above-mentioned additives when necessary is kneaded for about 30 minutes in a roll mill which is heated to 130° C. to 140° C., cooled to the room temperature, ground to a powder and classified, so that toner particles with a particle size of 5 to 15 μm can be obtained for the magenta toner according to the present invention.

The magenta toner according to the present invention can be used as a one-component type developer in a development unit as shown in FIG. 1. In the development unit in FIG. 1, a toner 6 placed in a toner reservoir 7 is forcibly brought onto a sponge roller 4 by a stirring blade 5 so that the toner 6 is supplied onto the sponge roller 4. As the sponge roller 4 is rotated in the direction of the arrow, the toner 6 fed to the sponge roller 4 is transported onto a toner transportation member 2, where the toner 6 is frictioned, and electrostatically or physically attracted to the toner transportation member 2. As the toner transportation member 2 is rotated in the direction of the arrow, a uniformly thin layer of the toner 6 is formed on the toner transportation member 2 by an elastic blade 3. At the same time, the thin layer of the toner 6 is triboelectrically charged. The toner 6 is then transported onto the surface of a latent electrostatic image bearing member 1 which is situated in contact with or near the toner transportation member 2, so that the latent electrostatic image is developed with the toner 6 to a visible toner image.

Alternatively, the magenta toner according to the present invention can be used as a two-component type developer by blending this magenta toner and non-coated carrier particles such as finely-divided iron, steel, or ferrite particles, or coated carrier particles coated by fluorine-contained resin, silicone resin, acrylic resin, or styrene-acrylic resin, which resins can be used alone or as a mixture or in the form of a copolymer thereof.

When the magenta toner according to the present invention is used as a two-component type developer, it is preferable that the amount of the magenta toner be in the range of 2 to 5 parts by weight to 100 parts by weight of the carrier particles.

The present invention will now be explained in detail with reference to the following examples, which are given for illustration of the invention and are not intended to be limiting thereof.

EXAMPLE 1

6 parts by weight of a magenta coloring composition consisting of 4 parts by weight of thioindigo pigment No. 1 and 2 parts by weight of Oil Pink OP (xanthene dye), 100 parts by weight of poly(styrene-ethyl methacrylate) serving as binder resin, and 2 parts by weight of zinc complex of salicylic acid serving as charge controlling agent were blended in a Henshel mixer.

The thus blended mixture was kneaded and fused in a ball mill at a temperature of about 130° C. for 30 minutes, cooled to a room temperature, pulverized and classified, whereby Magenta Toner No. 1 having a particle size of 5 to 15 μm according to the present invention was prepared.

3 parts by weight of the above prepared magenta toner and 97 parts by weight of silicone resin-coated carrier particles were mixed in a ball mill for 30 minutes, and then the charge quantity of the magenta toner was measured. The result was that the charge quantity of Magenta Toner No. 1 was −18 μC/g.

By cascade development, the above-prepared magenta toner was deposited on a sheet of paper with an average toner deposition amount of 1.0 mg/cm$^2$. The thus deposited magenta toner was fixed to the paper with application of heat thereto by a silicone-roller built-in image fixing unit at a temperature of about 160° C., whereby a toner image sample was prepared.

The color of the thus obtained toner image sample was measured by a color difference meter (Trademark CR100 made by Minolta Camera Co., Ltd.) and the measured color was specified by CIE 1976 L*a*b* color space.

The same toner image sample was further subjected to an exposure test by use of a weatherometer for 20 hours. The color of the thus obtained toner image sample was also measured by the above-mentioned color difference meter (Trademark CR100 made by Minolta Camera Co., Ltd.) and the measured color was specified by the CIE 1976 L*a*b* color space.

The change in the color (ΔE) of the sample between before and after the exposure test was calculated from the results of the above measurements by using the following formula:

$$\Delta E = \{(L^*_1 - L^*_2)^2 + (a^*_1 - a^*_2)^2 + (b^*_1 - b^*_2)^2\}^{\frac{1}{2}}$$

wherein $L^*_1$, $a^*_1$ and $b^*_1$ represent the color data obtained before the exposure test; and $L^*_2$, $a^*_2$ and $b^*_2$ represent the color data obtained after the exposure test.

The color data obtained before the exposure test were as follows:

$$L^*_1 = 55; a^*_1 = 64; b^*_1 = -17; \Delta E = 5.4$$

In the above data, the smaller the value of ΔE, the smaller the change in the color. In other words, a magenta toner which shows a small value of ΔE has good resistance to light.

In addition, it is preferable that the value of a* be in the range of 60 to 80, and the value of b* be in the range of −5 to −25. When the value of a* is below 60, the obtained sample lacks the clearness or brightness of magenta color.

EXAMPLES 2 to 8

Magenta Toners No. 2 to No. 8 according to the present invention were prepared with the respective formulations in Table 1, using both thioindigo pigments and xanthene dyes in combination, in the same manner as that for Magenta Toner No. 1 in Example 1.

The procedure of Example 1 was repeated except that Magenta Toner No. 1 employed in Example 1 was successively replaced by Magenta Toners No. 2 to No. 8, whereby the charge quantity (μC/g) of each toner, the color of the toner image sample obtained by each toner before the exposure test, and ΔE were measured, which are also shown in Table 1.

COMPARATIVE EXAMPLES 1 to 8

Comparative Magenta Toners No. 1 to No. 8 were prepared with the respective formulations as shown in Table 2, using either thioindigo pigments or xanthene dyes in the same manner as that for Magenta Toner No. 1 in Example 1.

The procedure of Example 1 was repeated except that Magenta Toner No. 1 employed in Example 1 was successively replaced by Comparative Magenta Toners No. 1 to No. 8, whereby the charge quantity (μC/g) of each toner, the color of the image sample obtained by each toner before the exposure test, and ΔE were measured, which are also shown in Table 2.

before the exposure test, and ΔE were measured, which are also shown in Table 3.

COMPARATIVE EXAMPLES 9 to 16

Comparative Magenta Toners No. 9 to No. 16 were

TABLE 1

| Example | Magenta Coloring Composition | Parts by Weight | Binder Resin | Parts by Weight | Charge Controlling Agent | Parts by Weight | Charge Quantity (μC/g) | Color of Toner Image Sample before Exposure Test | | | ΔE |
|---|---|---|---|---|---|---|---|---|---|---|---|
| | | | | | | | | $L_1^*$ | $a_1^*$ | $b_1^*$ | |
| 1 | Thioindigo pigment (No.1) Oil Pink OP | 4 2 | Poly(styrene-ethyl methacrylate) | 100 | Zinc complex of salicylic acid | 2 | −18 | 55 | 64 | −17 | 5.4 |
| 2 | Thioindigo pigment (No.2) Rhodamine Base B | 4 2 | Polyester | 100 | Zinc complex of salicylic acid | 2 | −20 | 55 | 63 | −18 | 5.5 |
| 3 | Thioindigo pigment (No.3) Rhodamine Base B | 4 2 | Epoxy resin | 100 | Zinc complex of salicylic acid | 2 | −17 | 56 | 66 | −16 | 5.6 |
| 4 | Thioindigo pigment (No.4) Oil Pink OP | 4 2 | Poly(styrene-methyl acrylate) | 100 | Zinc complex of salicylic acid | 2 | −19 | 55 | 67 | −20 | 5.2 |
| 5 | Thioindigo pigment (No.1) Rhodamine Base B | 4 2 | Poly(styrene-ethyl methacrylate) | 100 | Quaternary ammonium salt | 2 | +17 | 56 | 65 | −17 | 5.4 |
| 6 | Thioindigo pigment (No.2) Rhodamine Base B | 4 2 | Epoxy resin | 100 | Quaternary ammonium salt | 2 | +18 | 57 | 64 | −18 | 5.7 |
| 7 | Thioindigo pigment (No.3) Oil Pink #312 | 4 2 | Epoxy resin | 100 | Quaternary ammonium salt | 2 | +19 | 55 | 65 | −16 | 5.7 |
| 8 | Thioindigo pigment (No.4) Oil Pink #312 | 4 2 | Poly(styrene-methyl acrylate) | 100 | Quaternary ammonium salt | 2 | +20 | 56 | 67 | −17 | 5.3 |

TABLE 2

| Comparative Example | Magenta Coloring Composition | Parts by Weight | Binder Resin | Parts by Weight | Charge Controlling Agent | Parts by Weight | Charge Quantity (μC/g) | Color of Toner Image Sample before Exposure Test | | | ΔE |
|---|---|---|---|---|---|---|---|---|---|---|---|
| | | | | | | | | $L_1^*$ | $a_1^*$ | $b_1^*$ | |
| 1 | Thioindigo pigment (No.1) | 5 | Poly(styrene-ethyl methacrylate) | 100 | Zinc complex of salicylic acid | 2 | −14 | 57 | 51 | 2 | 0.6 |
| 2 | Thioindigo pigment (No.2) | 5 | Polyester | 100 | Zinc complex of salicylic acid | 2 | −21 | 55 | 50 | 1 | 1.0 |
| 3 | Rhodamine Base B | 5 | Epoxy resin | 100 | Zinc complex of salicylic acid | 2 | −18 | 56 | 66 | −23 | 24.8 |
| 4 | Oil Pink OP | 2 | Poly(styrene-methyl acrylate) | 100 | Zinc complex of salicylic acid | 2 | −17 | 58 | 65 | −24 | 22.6 |
| 5 | Thioindigo pigment (No.1) | 5 | Poly(styrene-ethyl acrylate) | 100 | Quaternary ammonium salt | 2 | +22 | 57 | 52 | 3 | 0.7 |
| 6 | Thioindigo pigment (No.2) | 5 | Epoxy resin | 100 | Quaternary ammonium salt | 2 | +19 | 55 | 51 | 2 | 1.6 |
| 7 | Oil Pink #312 | 5 | Epoxy resin | 100 | Quaternary ammonium salt | 2 | +18 | 56 | 65 | −22 | 27.8 |
| 8 | Oil Pink #312 | 5 | Poly(styrene-methyl acrylate) | 100 | Quaternary ammonium salt | 2 | +20 | 58 | 66 | −24 | 25.5 |

EXAMPLES 9 to 16

Magenta Toners No. 9 to No. 16 according to the present invention were prepared with the respective formulations in Table 1, using both thioindigo pigments and laked xanthene dyes in combination, in the same manner as that for Magenta Toner No. 1 in Example 1.

The procedure of Example 1 was repeated except that Magenta Toner No. 1 employed in Example 1 was successively replaced by Magenta Toners No. 9 to No. 16, whereby the charge quantity (μC/g) of each toner, the color of the image sample obtained by each toner before the exposure test, and ΔE were measured, which are also shown in Table 4.

prepared with the respective formulations as shown in Table 4, using either thioindigo pigments or laked xanthene dyes in the same manner as that for Magenta Toner No. 1 in Example 1.

The procedure of Example 1 was repeated except that Magenta Toner No. 1 employed in Example 1 was successively replaced by Comparative Magenta Toners No. 1 to No. 8, whereby the charge quantity (μC/g) of each toner, the color of the image sample obtained by each toner before the exposure test, and ΔE were measured, which are also shown in Table 4.

TABLE 3

| Example | Magenta Coloring Composition | Parts by Weight | Binder Resin | Parts by Weight | Charge Controlling Agent | Parts by Weight | Charge Quantity (μC/g) | $L_1^*$ | $a_1^*$ | $b_1^*$ | ΔE |
|---|---|---|---|---|---|---|---|---|---|---|---|
| 9 | Thioindigo pigment (No.1) | 4 | Poly(styrene-ethyl methacrylate) | 100 | Zinc complex of salicylic acid | 2 | −17 | 56 | 65 | −18 | 5.2 |
|  | Laked Oil Pink OP | 2 |  |  |  |  |  |  |  |  |  |
| 10 | Thioindigo pigment (No.2) | 4 | Polyester | 100 | Zinc complex of salicylic acid | 2 | −19 | 55 | 62 | −17 | 5.7 |
|  | Laked Rhodamine Base B | 2 |  |  |  |  |  |  |  |  |  |
| 11 | Thioindigo pigment (No.3) | 4 | Epoxy resin | 100 | Zinc complex of salicylic acid | 2 | −15 | 57 | 66 | −15 | 5.5 |
|  | Laked Rhodamine Base B | 2 |  |  |  |  |  |  |  |  |  |
| 12 | Thioindigo pigment (No.4) | 4 | Poly(styrene-methyl acrylate) | 100 | Zinc complex of salicylic acid | 2 | −18 | 56 | 64 | −19 | 5.0 |
|  | Laked Oil Pink OP | 2 |  |  |  |  |  |  |  |  |  |
| 13 | Thioindigo pigment (No.1) | 4 | Poly(styrene-ethyl methacrylate) | 100 | Quaternary ammonium salt | 2 | +18 | 56 | 63 | −16 | 5.3 |
|  | Laked Rhodamine Base B | 2 |  |  |  |  |  |  |  |  |  |
| 14 | Thioindigo pigment (No.2) | 4 | Epoxy resin | 100 | Quaternary ammonium salt | 2 | +17 | 55 | 67 | −20 | 5.8 |
|  | Laked Rhodamine Base B | 2 |  |  |  |  |  |  |  |  |  |
| 15 | Thioindigo pigment (No.3) | 4 | Epoxy resin | 100 | Quaternary ammonium salt | 2 | +17 | 55 | 66 | −18 | 5.9 |
|  | Laked Oil Pink #312 | 2 |  |  |  |  |  |  |  |  |  |
| 16 | Thioindigo pigment (No.4) | 4 | Poly(styrene-methyl acrylate) | 100 | Quaternary ammonium salt | 2 | +21 | 55 | 65 | −16 | 5.1 |
|  | Laked Oil Pink #312 | 2 |  |  |  |  |  |  |  |  |  |

TABLE 4

| Comparative Example | Magenta Coloring Composition | Parts by Weight | Binder Resin | Parts by Weight | Charge Controlling Agent | Parts by Weight | Charge Quantity (μC/g) | $L_1^*$ | $a_1^*$ | $b_1^*$ | ΔE |
|---|---|---|---|---|---|---|---|---|---|---|---|
| 9 | Thioindigo pigment (No.1) | 5 | Poly(styrene-ethyl methacrylate) | 100 | Zinc complex of Salicylic acid | 2 | −13 | 56 | 50 | 1 | 0.7 |
| 10 | Thioindigo pigment (No.2) | 5 | Polyester | 100 | Zinc complex of salicylic acid | 2 | −22 | 58 | 51 | 0 | 1.2 |
| 11 | Laked Rhodamine Base B | 5 | Epoxy resin | 100 | Zinc complex of salicylic acid | 2 | −17 | 56 | 65 | −24 | 24.6 |
| 12 | Laked Oil Pink OP | 2 | Poly(styrene-methyl acrylate) | 100 | Zinc complex of salicylic acid | 2 | −16 | 55 | 66 | −25 | 22.8 |
| 13 | Thioindigo pigment (No.1) | 5 | Poly(styrene-ethyl acrylate) | 100 | Quaternary ammonium salt | 2 | +21 | 56 | 51 | 2 | 0.9 |
| 14 | Thioindigo pigment (No.2) | 5 | Epoxy resin | 100 | Quaternary ammonium salt | 2 | +18 | 58 | 50 | 4 | 1.7 |
| 15 | Laked Oil Pink #312 | 5 | Epoxy resin | 100 | Quaternary ammonium salt | 2 | +16 | 56 | 66 | −23 | 27.4 |
| 16 | Laked Oil Pink #312 | 5 | Poly(styrene-methyl acrylate) | 100 | Quaternary ammonium salt | 2 | +22 | 55 | 65 | −25 | 25.3 |

What is claimed is:

1. A magenta toner comprising:
a coloring composition comprising a thioindigo pigment, and a xanthene dye having general formula (I) or a laked xanthene dye thereof, and a binder resin:

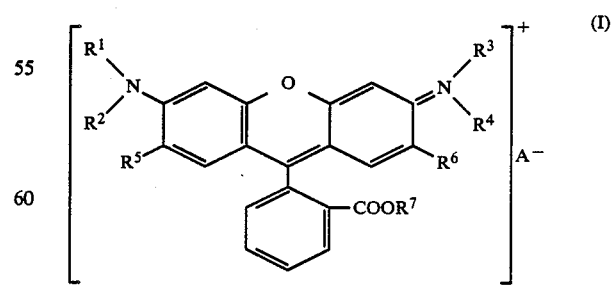

wherein $R^1$, $R^2$, $R^5$, $R^6$, and $R^7$ each represent hydrogen or a lower alkyl group; $R^3$ and $R^4$ each represent a lower alkyl group; and $A^-$ represents halogen.

2. The magenta toner as claimed in claim 1, wherein the amount of said thioindigo pigment is in the range of 0.5 to 20 parts by weight to 100 parts by weight of said binder resin.

3. The magenta toner as claimed in claim 1, wherein the amount of said xanthene dye or said laked xanthene dye is in the range of 0.2 to 20 parts by weight to 100 parts by weight of said resin binder.

4. The magenta toner as claimed in claim 1, wherein the amount of said xanthene dye or said laked xanthene dye is in the range of 0.5 to 10 parts by weight to 100 parts by weight of said resin binder.

5. The magenta toner as claimed in claim 1, wherein said thioindigo pigment is a compound having general formula:

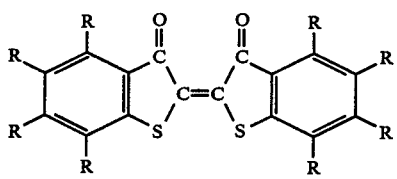

wherein R represents H, a methyl group, or Cl.

6. The magenta toner as claimed in claim 1, wherein said thioindigo pigment is a compound having general formula:

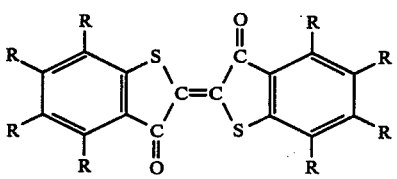

wherein R represents H, a methyl group, or Cl.

7. The magenta toner as claimed in claim 5, wherein said thioindigo pigment is selected from the group consisting of:

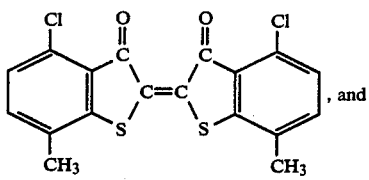, and

-continued

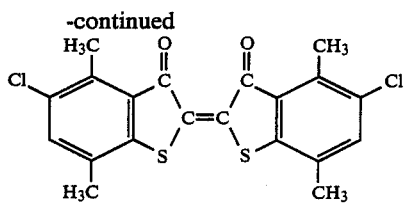

8. The magenta toner as claimed in claim 6, wherein said thioindigo pigment is selected from the group consisting of:

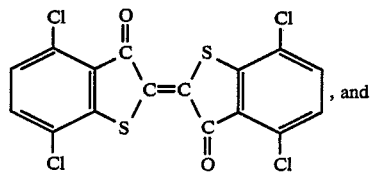, and

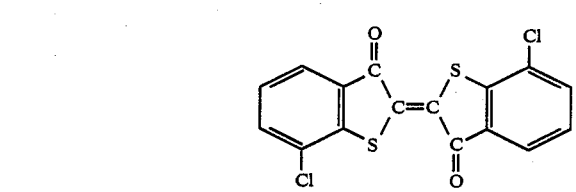

9. The magenta toner as claimed in claim 1, wherein said xanthene dye is selected from the group consisting of C.I. Solvent Red 49, C.I. Solvent Red 52, and C.I. Solvent Red 180.

10. The magenta toner as claimed in claim 1, wherein the ratio of the amount of said thioindigo pigment to the amount of said xanthene dye or said laked xanthene dye is in the range of (1:1) to (5:1).

11. The magenta toner as claimed in claim 1, further comprising a charge controlling agent.

12. The magenta toner as claimed in claim 11, wherein said charge controlling agent is a negative charge controlling agent.

13. The magenta toner as claimed in claim 11, wherein said charge controlling agent is a positive charge controlling agent.

14. The magenta toner as claimed in claim 1, wherein said binder resin has a glass transition temperature ranging from about 40° C. to about 150° C.

15. The magenta toner as claimed in claim 14, wherein said binder resin is selected from the group consisting of styrene polymer, acrylic resin, epoxy resin and polyester resin.

* * * * *